(12) United States Patent
Hong et al.

(10) Patent No.: US 9,484,736 B2
(45) Date of Patent: Nov. 1, 2016

(54) METHOD FOR DETERMINING FLOODED STATE AND ELECTRONIC DEVICE THEREOF

(71) Applicant: Samsung Electronics Co., Ltd., Gyeonggi-do (KR)

(72) Inventors: Hyun-Ju Hong, Gyeonggi-do (KR); Seung-Ki Choi, Gyeonggi-do (KR)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 229 days.

(21) Appl. No.: 14/251,986

(22) Filed: Apr. 14, 2014

(65) Prior Publication Data

US 2014/0307356 A1 Oct. 16, 2014

(30) Foreign Application Priority Data

Apr. 15, 2013 (KR) .......................... 10-2013-0041106

(51) Int. Cl.
*H02H 3/00* (2006.01)
*H02H 5/08* (2006.01)

(52) U.S. Cl.
CPC .................... *H02H 5/083* (2013.01)

(58) Field of Classification Search
CPC ..................................................... H02H 5/083
See application file for complete search history.

(56) References Cited

U.S. PATENT DOCUMENTS

| 5,563,493 A * | 10/1996 | Matsuda ................. G06F 1/263 320/124 |
| 2013/0255665 A1* | 10/2013 | Nickel ..................... F24J 2/461 126/595 |
| 2014/0237268 A1* | 8/2014 | Mese ........................ G06F 1/26 713/300 |

FOREIGN PATENT DOCUMENTS

| KR | 10-2005-0006577 A | 1/2005 |
| KR | 10-2007-0041859 A | 4/2007 |

\* cited by examiner

*Primary Examiner* — Thienvu Tran
*Assistant Examiner* — Tien Mai
(74) *Attorney, Agent, or Firm* — Cha & Reiter, LLC

(57) ABSTRACT

Provided is an operating method of an electronic device including a first processor, a humidity sensor, a second processor controlling the humidity sensor, and a battery, wherein the second processor and the battery are water-proofed. The method may include: detecting a power supply event from the battery; supplying a power from the battery to the second processor controlling the humidity sensor and not supplying the power to the first processor; determining, by the second processor, a humidity of the electronic device by using the humidity sensor; and when the humidity of the electronic device is greater than a first reference humidity, cutting off power supply from the battery and when the humidity of the electronic device is less than the first reference humidity, supplying the power to the first processor.

16 Claims, 12 Drawing Sheets

METHOD FOR DETERMINING FLOODED STATE AND ELECTRONIC DEVICE THEREOF

CLAIM OF PRIORITY

This application claims priority under 35 U.S.C. §119 to an application filed in the Korean Intellectual Property Office on Apr. 15, 2013 and assigned Serial No. 10-2013-0041106, the entire contents of which are incorporated herein by reference.

BACKGROUND

1. Technical Field

The present disclosure relates generally to a method for determining a flooded state and an electronic device that is configured to determine whether the electronic device is in flooded state (e.g., the humidity of the electronic device is above a predetermined level).

2. Description of the Related Art

As mobile communication technology advances, portable electronic communication devices are becoming essential to individuals. These electronic devices not only provide communication functions, but they also provide additional functionality including, for example, functioning as a camera, a data communication device, video playback device, audio playback device, a messenger device, scheduling device, and an alarm. As the portability of such electric devices increases, the electronic device there is a risk of flooding under external various conditions.

In the past, a method of determining a flooded state of an electronic device was performed by observing the discoloration of a liquid contact indicator attached to a predetermined location to an electronic device. Alternatively, another method of determining a flooded state has included using a humidity sensor or a sensing unit determining the flooding and cutting off the power of an electronic device when flooded.

When a liquid contact indicator is used, reading errors may result because the reading could be corrupted by humidity instead of flooding and also it is difficult to realize an accurate condition at the time of flooding. Therefore, certain under certain conditions, accurate data cannot be provided to a consumer and a power-off function for circuit protection of an electronic device in a flooded state may not be used appropriately. Additionally, when a power supply is restored to the electric device following its being powered off, there may be vulnerability to additional damage resulting from a short circuit.

SUMMARY

An aspect of the present disclosure is to substantially solve at least the above problems and/or disadvantages and to provide at least the advantages below. In an embodiment of the present disclosure, a humidity sensor and a micro controller unit (MCU) for controlling the humidity sensor are provided and are configured to determine a flooded state.

Another aspect of the present disclosure is to provide a method and device that prevents additional damage of a system by controlling the power supply to an electronic device depending on the degree of humidity after realizing a humidity of the electronic device and attempting power connection when flooded.

Another aspect of the present disclosure is to provide a method and device for recording information on an electronic device such as a date, a time, a position, and a running application list at the time of flooding.

Another aspect of the present disclosure is to provide a method and device for operating an electronic device normally, even when being flooded, by water-proofing components such as a humidity sensor, a controller, a battery, and memory, which are necessary for an operation of a sensor unit and data storage.

According to a further aspect of the present disclosure, an electronic device may include a first processor, a humidity sensor, a second processor controlling the humidity sensor, and a battery. The second processor and the battery may be waterproofed. A method of operating the electronic device may include detecting a power supply event from the battery, supplying a power from the battery to the second processor controlling the humidity sensor and not supplying the power to the first processor, determining, by the second processor, a humidity of the electronic device by using the humidity sensor, and when the humidity of the electronic device is greater than a first reference humidity, cutting off power supply from the battery and when the humidity of the electronic device is less than the first reference humidity, and supplying the power to the first processor.

According to another aspect of the present disclosure, an electronic device may include a first processor, a power management unit, a memory, a second processor, a battery, and a humidity sensor. The second processor may control the humidity sensor. The power management unit may control the power supply from the battery. The power management unit, the memory, the second processor, and the battery may be waterproofed. A method of operating the electronic device may include determining whether the electronic device is flooded on the basis of whether a humidity of the electronic device obtained by using the humidity sensor is greater than a first reference humidity, and storing, by the first processor, data in the memory, According to a still further aspect of the present disclosure, an electronic device may include a battery, a first processor, a second processor, a memory, at least one program stored in the memory and executed by the at least one processor, and a humidity sensor operated by a second processor. Once a power supply event from the battery is detected, a power from the battery may be supplied to the second processor controlling the humidity sensor, and no power may be supplied to the first processor. When a humidity of the electronic device is greater than a first reference humidity, the second processor cuts off power supply from the battery by using the humidity sensor. When the humidity of the electronic device is less than the first reference humidity, the second processor may supply the power to the first processor.

According to yet another aspect of the present disclosure, an electronic device may include a battery, a power management unit supplying a power of the battery to the electronic device, at least one processor, a memory, at least one program stored in the memory and executed by the at least one processor, and a humidity sensor operated by a second processor. The at least one program may include a command for determining when a humidity of the electronic device obtained using the humidity sensor is greater than a first reference humidity, and may in response to flooding store data in the memory through a first processor. When power is cut off and then is supplied to the electronic device, the data stored in the memory includes one of a command for determining the power supply to the first processor by the second processor and information indicating whether the electronic device is flooded.

These and other embodiments of the present disclosure will be described in greater detail with reference to the accompanying figures.

BRIEF DESCRIPTION OF THE DRAWINGS

The above and other aspects, features and advantages of the present disclosure will become more apparent from the following detailed description when taken in conjunction with the accompanying drawings in which.

DETAILED DESCRIPTION

Figure 1:
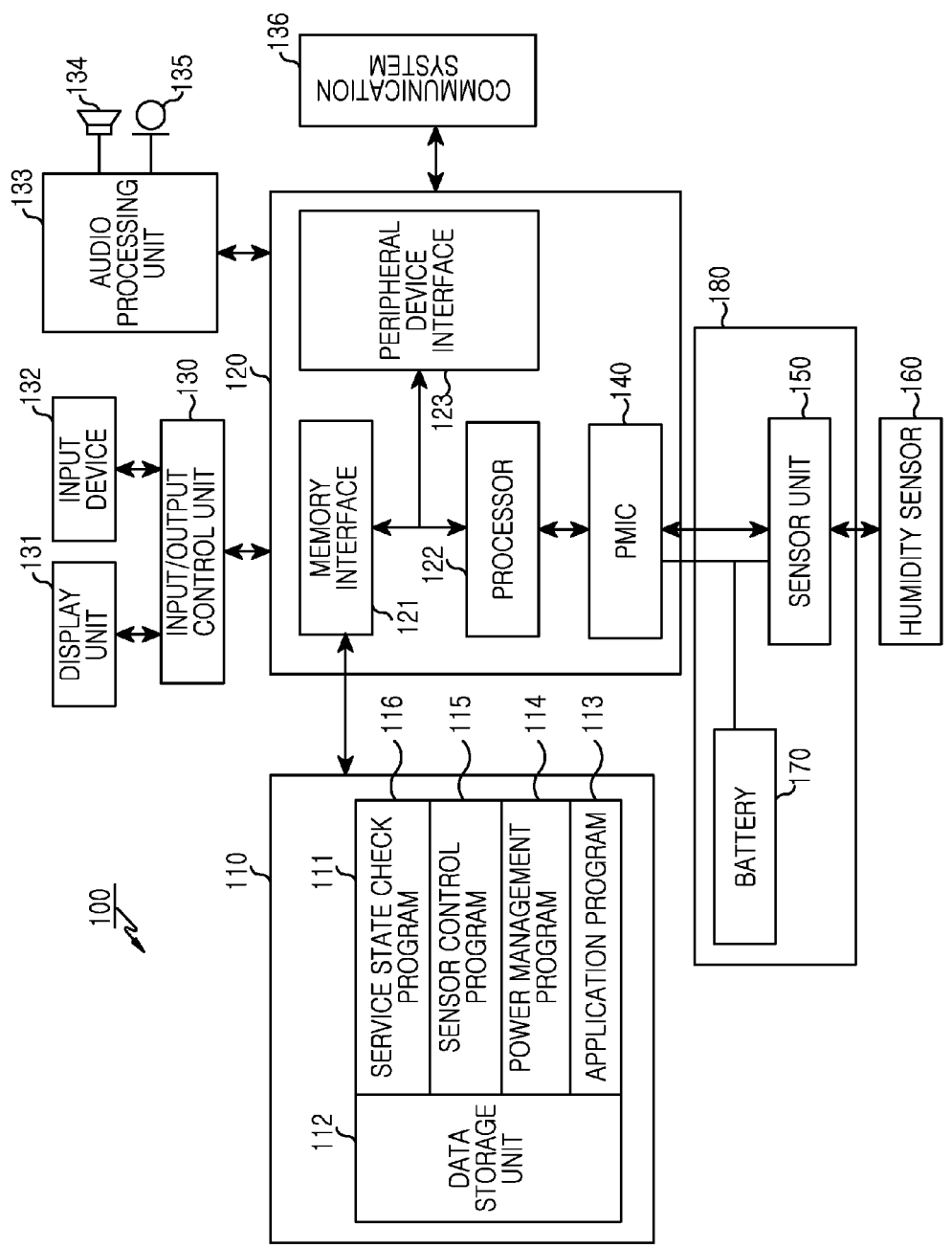
FIG. 1 is a block diagram illustrating an electronic device according to an embodiment of the present disclosure.

Hereinafter, embodiments of the present invention will be described in more detail with reference to the accompanying drawings. In the following description, detailed descriptions of well-known functions or constructions will be omitted so that the invention is not obscured in unnecessary detail. Also, the terms used herein are defined according to the functions of the present invention. Thus, the terms may vary depending on the user's or operator's intentions or practices. Therefore, the terms used herein are to be understood based on the descriptions made herein.

In an embodiment, when an electronic device 100 (FIG. 1) is in a flooded state before cutting off power or when a processor 122 attempts to perform a power connection after power of the electronic device 100 has been cut off, power supply to non-waterproof components of the electronic device 100 is delayed, and power is supplied to a waterproof sensor unit 150, which independently measures a humidity of the electronic device 100 through a humidity sensor 160 without being controlled by the processor 122. The sensor unit 150 may supply power to all non-waterproof components of the electronic device 100 only if a measured humidity is within a reference humidity range of a normal operation, and cuts off power if the measured humidity is not within this range.

Accordingly, when a user attempts to supply power to the electronic device 100 after it has flooded, power supply is delayed with respect to non-waterproof components of the electronic device 100 and power is supplied to the waterproof sensor unit 150. A controller 152 (FIG. 3B) configuring the sensor unit 150 drives a humidity sensor 160 to measure a humidity of the electronic device 100. Additionally, the controller 152 supplies power via power management integrated circuit (PMIC) 140 to all non-waterproof components of the electronic device 100 only if the measured humidity is within a reference humidity range of a normal operation and cuts off power to the electronic device 100 if not.

A processor 122 realizes humidity information of the electronic device 100 periodically by using the humidity sensor 160 and stores information at the time of flooding of the electronic device 100 when the measured humidity information exceeds a reference humidity for determining the state of flooding, and then provides objective and detailed information.

The electronic device 100 may include a mobile communication terminal, a PDA, a PC, a laptop, a smart phone, a netbook, a mobile internet device (MID), a ultra mobile PC (UMPC), a tablet PC, a navigator, and an MP3, any of which may include the humidity sensor 160.

It will also be understood that when a component is referred to as "being connected to" or "in access to" another component, it can be directly "connected to" or "in access to" the other component, or intervening components connecting the two components may also be present. It will also be understood that when a component is referred to as "being directly connected to" or "in direct access to" another component, no intervening components connecting the two components may also be present.

To avoid confusion among the following terms: a power source, a power, and a battery, the power source is to be defined as a source for supplying electrical energy such as power, the power is to be defined as electrical energy or work done by current for each unit of time, and the battery is to be defined as a physical device having the power source.

FIG. 1 is a block diagram illustrating the electronic device 100 according to an embodiment of the present invention.

In an embodiment, as shown in FIG. 1, the electronic device 100 may include a memory 110, a processor unit 120, the power management IC (PMIC) 140, the sensor unit 150, the humidity sensor 160, a battery 170, and a peripheral device.

The memory 110 may include a program storage unit 111 storing a program for controlling an operation of the electronic device 100 and a data storage unit 112 storing data generated during program execution, so that it may store data generated from a program due to an operation of the processor 122, the power management IC (PMIC) 140, and/or, the sensor unit 150.

In an embodiment, the data storage unit 112 may store information collected by sensors of the sensor unit 150 during the flooding of the electronic device 100, and may store data including a command on a changed operation if a procedure of supplying power is changed by the processor 122 as power is supplied again after the flooding. The program storage unit 111 may include a service state check program 116, a sensor control program 115, a power management program 114, and at least one application program 113. Here, a program included in the program storage unit 111 may be expressed in a set including instructions.

The sensor control program 115 controls operations of various kinds of sensors configuring a sensor unit of the electronic device 100. For example, the processor 122 or the controller 152 may control an operation of the humidity sensor 160 through the sensor control program 115 and collect information on a humidity of the electronic device 100 periodically. Additionally, if the humidity information measured by the humidity sensor 160 is a flooded state, in order to realize a state of the electronic device 100 at the time of flooding, information on a state of the electronic device 100 may be collected by operating various kinds of sensors such as an illumination sensor (not shown) measuring illumination, a global positioning system (GPS) (not shown) measuring position information, an acceleration sensor (not shown) measuring a movement of the electronic device 100, and a gyroscope (not shown).

Furthermore, the processor 122 may operate sensors by controlling the controller 152. The controller 152 operating independent from the processor 122 may operate sensors through the sensor control program 115.

According to an embodiment of the present invention, when a power connection to the electronic device 100 is attempted again after power is cut off, the processor 122 of the power device 100 may delay power supply and measure humidity information of the electronic device 100 by driving the humidity sensor 160 through the controller 152 of a waterproof unit 180. Since no power is supplied to the non-waterproof processor 122 and other electronic devices, the controller 152 is linked to the sensor control program 115, being independent from the processor 122, and determines whether to supply power to an electronic device by using a sensor.

The power management program 114 may control power supplied to each component of the electronic device 100 through a power management unit of the electronic device 100 or the power management IC 140 configuring the power management unit. For example, the power management program 114 may determine a signal on power necessary for each component, once power is supplied to the electronic device 100, and may control power by controlling voltage to be appropriate through the power management IC 140.

Additionally, the power management program 144 modifies a method of processing a signal for controlling power to be supplied to each component of the electronic device 100, so as to determine power supply timing.

According to an embodiment of the present invention, in relation to a method of controlling power supply when power connection to the electronic device 100 whose power is cut off due to flooding is attempted, the processor 122 may be set to delay processing of signals for supplying power to non-waterproof devices including the processor 122 when power connection to the electronic device 100 is attempted through the power management program 114 at the time of flooding, which may be performed by the power management IC 140 according to set information.

Determining power supply or power supply timing may be made by the controller 152 in the waterproof sensor unit 150 in addition to the processor 122.

The service state check program 116 may include at least one software component for checking a state of a service provided from the electronic device 100.

In an embodiment, the controller 152 of the electronic device 100 may determine a flooded state by using the humidity sensor 160, stores state information on the electronic device 100 at the time of flooding, limits power supply of the electronic device 100 at the time of flood, and detects that power supply is delayed, and also may include a command for checking power supply determination by using the humidity sensor 160.

The application program 113 may include a software component for at least one application program installed in the electronic device 100.

The memory 110 of the electronic device 100 may include at least one of the program storage unit 111 or the data storage unit 112, or two functions thereof, depending on uses, and in terms of device characteristics, a physical area in the memory 110 may not be specified.

The processor unit 120 may include a memory interface 121, at least one processor 122, and a peripheral device interface 123. The memory interface 121, the at least one processor 122, and the peripheral device interface 123 in the processor unit 120 may be implemented using at least one integrated circuit or an additional component.

Moreover, the processor unit 120 may control an operation of the electronic device 100. The processor 122 of the processor unit 120 may deliver a command to the power management IC 140, and may control the sensor unit 150, which may operate independently if necessary. The processor unit 120 may control the electronic device 100 including its constituent components such as a peripheral device, the memory 110, the power management IC 140, a battery, and the sensor unit 150.

The memory interface 121 may control access to the memory 110 of components such as the processor 122 or the peripheral device interface 123.

The peripheral device interface 123 may control a connection between an input/output peripheral device, the processor 122, and the memory interface 121 of the electronic device 100. The processor 122 may control the electronic device 100 to provide services such as various multimedia and communication through at least one software program. At this point, the processor 122 executes at least one program stored in the memory 110 so as to provide a function corresponding to a corresponding program.

Although a power management unit is not shown, the power management IC 140 may be responsible for power supply to the electronic device 100. The power management unit may include a physical, software, and/or systematic device including a switch in addition to the power management IC 140, so as to supply battery power to the electronic device 100 according a programmed standard.

The PMIC 140 may control power supply of the electronic device 100. The PMIC 140 may be disposed in or outside the processor unit 120.

Additionally, the PMIC 140 controls power for components of the electronic device 100, such as the processor unit 120, the memory 110, the sensor unit 150, and a peripheral device, according to an existing programmed state. The processor 122 may control the power supply to the PMIC 140 by changing a command of the power management program 114, and changed information may be stored in the memory 110 in the sensor unit 150 and the memory 110 in the electronic device 100.

In an embodiment, when components other than the sensor unit 150 and the battery 170 in the electronic device 100 are not waterproof, in order to successfully accomplish the object of the present invention, if power is applied again after flooding, the power is limited to the non-waterproof processor 122 and remaining devices. Accordingly, the processor 122 may supply power through the controller 152 of the waterproof sensor unit 150 before power is cut off after flooding, and the controller 152 may store in the memory 110 a command for delaying power supply to the non-waterproof processor 122 and devices until power supply to the electronic device 100 is determined. When power is applied to the electronic device 100 after flooding, the PMIC 140 may perform a command for power supply procedure stored in the memory 110, without additional manipulation.

Furthermore, according to a typical method, power supplied to the electronic device 100 is distributed and managed through setting information stored in the memory 110, device design, or the PMIC 140 of the processor 122.

The sensor unit 150 may control various kinds of sensors in the electronic device 100. Additionally, the sensor unit 150 may be physically connected to sensors, and the sensors may operate in response to a control of the sensor unit 150 that is independent from the processor 122. Alternatively, the sensor unit 150 may operate in response to a control of the processor unit 120, a control of the sensor unit 150, or a control of the processor unit 120.

Additionally, the sensor unit 150 may include the memory 110 and a micro controller unit, such as the controller 152, so as to efficiently manage sensors, independently of the processor 122.

The controller 152 may be configured with an integrated single chip including a memory (e.g., a ram) responsible for a predetermined function performed by a processor, a memory (e.g., a rom) for storing collected data storage, for example, flash memory such as electrically erasable programmable read-only memory (EEPROM), a timer such as a counter timer circuit, a parallel input/output (PIO) control unit, and a serial input/output (SIO) control unit, and may be distinguished from a cpu and mpu used for the typical electronic device 100.

In order to successfully accomplish an aspect of the present disclosure to prevent additional damage of a system due to an inappropriate power connection after flooding, power may be received through a path that is directly connected to the battery, and the controller 152 connected to the humidity sensor 160 detects that power supply to the processor unit 120 and devices may be delayed so as to measure a humidity of the electronic device 100 through the humidity sensor 160.

At this point, in order for a stable operation in a flooded state, the humidity sensor 160, the sensor unit 150 including the controller 152, and the battery may be waterproofed as one piece or separately.

The sensor unit 150 may include various kinds of sensors collecting state information of the electronic device 100, and may operate in response to a control of the processor 122 in the electronic device 100 or the controller 152 in the sensor unit 150.

In relation to the electronic device 100, the sensor unit may include various kinds of sensors obtaining a state of the electronic device 100 such as a GPS (not shown), an illumination sensor (not shown), and a gyroscope sensor (not shown) in addition to the humidity sensor 160.

The electronic device 100 may include at least one humidity sensor. In particular, the electronic device may include the humidity sensor 160, which is a device capable of measuring humidity. The humidity sensor 160 may detect and digitize humidity by using various physical and chemical phenomena relating to moisture in the air. The humidity sensor 160 may detect humidity through a method of using a change in electrical resistance or capacitance, or a change in resonant frequency of an oscillator. The humidity sensor 160 may include, for example, a psychrometer, a lithium chloride humidity sensor, an electrolytic humidity sensor, a polymer film humidity sensor, a correction vibration humidity sensor, an aluminum oxide moisture sensor, a ceramic humidity sensor, a microwave humidity sensor, a dew condensation sensor, and/or a dew point sensor.

Furthermore, an illumination sensor (not shown) may measure and digitize an illumination around the electronic device 100. An acceleration sensor (not shown) may measure and digitize dynamic power applied to the electronic device 100, such as acceleration, impact, and vibration of the electronic device 100. Additionally, if there is no impact from the outside, the acceleration sensor (not shown) detects a gravity direction. That is, the acceleration sensor serves as a tilt sensor to measure and digitize a change in tilt of the electronic device 100. A gyroscope (not shown) may measure and digitize a rotational inertia such as rotation and rotation speed (angular speed) of the electronic device 100.

The battery 170 may preserve power necessary for an operation of the electronic device 100. The electronic device 100 supplies power to a circuit and device through the PMIC 140 and the sensor unit 150, and may additionally include the battery 170 for an independent power supply to the sensor unit 150.

As shown in FIG. 1, an audio processing unit 133 may provide an audio interface between a user and the electronic device 100 through a speaker 134 and a microphone 135.

Also as shown in FIG. 1, a communication system 136 may perform a communication function. For example, the communication system 136 may communicate with a second electronic device (not shown) through at least one of a mobile communication via a base station, a short-range wireless communication (such as infrared and wireless communication (e.g., IrDA), and Bluetooth), a wireless LAN communication, and a wired communication.

The input/output control unit 130 may provide an interface between an input/output device (such as a display unit 131 and an input device 132) and an interface.

The input device 132 may provide input data generated by a user's selection to the processor unit 120 through the input/output control unit 130. For example, the input device 132 may be configured including only a control button for controlling the electronic device 100. As another example, the input device 132 may be configured with a keypad for receiving input data from a user. As another example, the input device 132 may be included in the display unit 131 as a touch screen type, which may include an electrostatic-type touch screen and a pressure-type touch screen.

The display unit 131 may display state information, such as, for example, characters entered by a user, moving pictures, and still pictures, of the electronic device 100. For example, the display unit 131 may display application program information driven by the processor 122.

Figure 2:
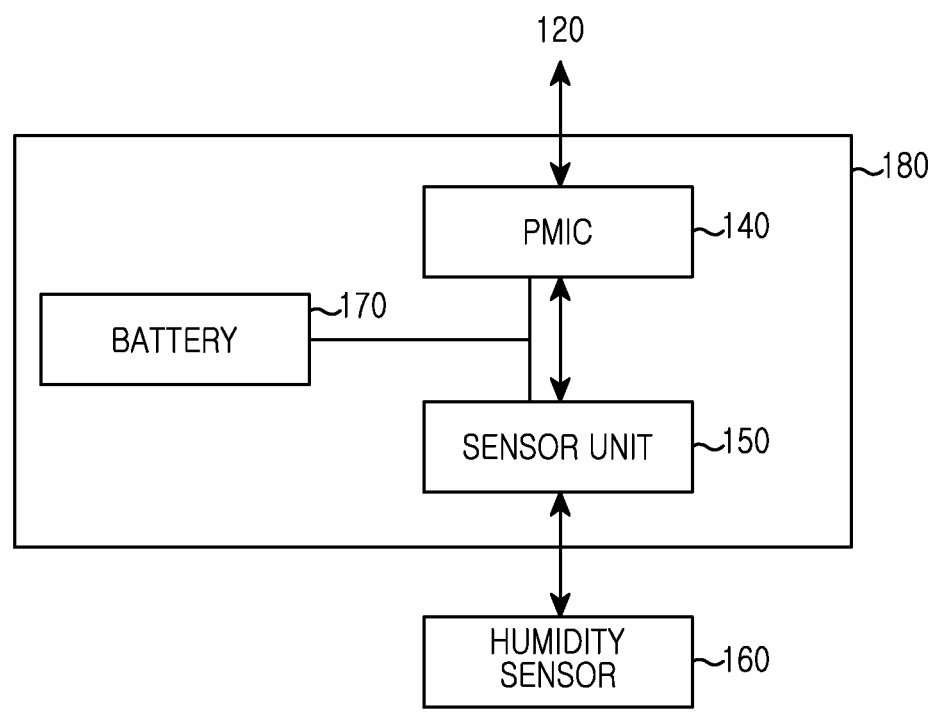
FIG. 2 is a block diagram illustrating a waterproof unit of an electronic device according to an embodiment of the present disclosure.

FIG. 2 is a block diagram illustrating the waterproof unit 180 of the electronic device 100 according to an embodiment of the present disclosure.

In the electronic device 100, the controller 152 and the humidity sensor 160 of the sensor unit 150 may be controlled by the processor 122. However, the controller 152 of the sensor unit 150 may operate the humidity sensor 160 independently of the processor 122. Accordingly, the waterproof unit 180 may be configured including the sensor unit 150 such that in the event of an emergency, such as flooding, one or more functions may be performed without being controlled by the processor 122.

In an embodiment, before flooding, the electronic device 100 may be controlled by the processor 122, and the humidity sensor 160 may also be controlled by the processor 122. Additionally, the humidity sensor 160 may be controlled by the controller 152, and the operations of the humidity sensor 160 and the controller 152 may be controlled by the processor 122. According to an embodiment of the present disclosure, when power is supplied again after power was cut off when the electronic device 100 was determined to be flooded, power is supplied first to the controller 152 of the sensor unit 150 to operate the humidity sensor 160. At this point, power may not be supplied to the processor 122 and peripheral devices except those devices that are may be used to determine a humidity of the electronic device 100 such as, for example, the controller 152 and the humidity sensor 160. Accordingly, in this case, the waterproof unit 180 may include components and devices determining a humidity of the electronic device 100, each of which may be separately configured. The waterproof unit 180 may also include the sensor unit 150 including the controller 152 controlling the humidity sensor 160. The waterproof unit 180 may be separated from the processor 122, the humidity sensor 160, and the battery 170. When the humidity sensor 160 is itself waterproofed, it may not be included necessarily be included within the waterproof unit, and may be mounted inside the electronic device 100 to perform a function in response to a control of the sensor unit 150.

Additionally, in relation to supplying power to the electronic device 100, if the PMIC 140 requires command information to delay a signal for supplying power to non-waterproof components according to information stored in the memory 110 without additional manipulation, the memory 110 storing information and the PMIC 140 executing a command according to the information of the memory 110 may be included in the configuration of the waterproof unit 180.

The waterproof unit 180 may implement a waterproof function by sealing through an independent configuration (modularization) of components and devices to be waterproofed, or by being covered with a resin such as an epoxy, a urethane, and a polyurethane for waterproofing components or devices.

Furthermore, besides the configuration of the waterproof unit 180, in relation to circuit waterproof between devices, a waterproof function may be performed by inhibiting the exposure of a circuit to air, for example, by positioning the circuit inside an insulating material forming a substrate during a process operation, or coating a circuit surface.

The waterproof unit 180 in the electronic device 100 may be configured through a method that is typically used to implement a waterproof function instead of the above methods.

Figure 3A:
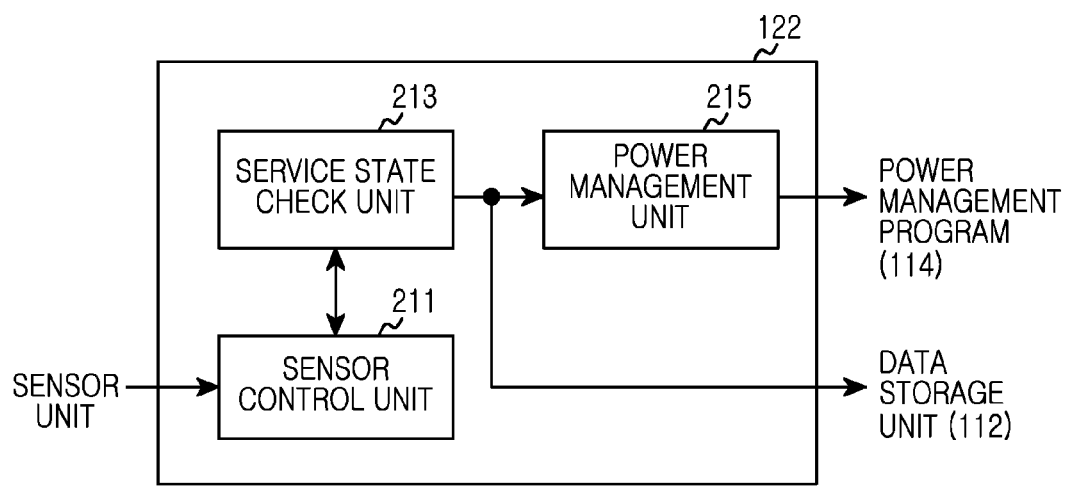
FIG. 3A is a block diagram illustrating a processor operation of an electronic device according to an embodiment of the present disclosure.

FIG. 3A is a block diagram illustrating an operation of the processor 122 of the electronic device 100 according to an embodiment of the present invention.

As shown in FIG. 3A, the processor 122 may include a sensor control unit 211, a service state check unit 213, and a power management unit 215.

The sensor control unit 211 may execute the censor control program 115 to control the sensors in the electronic device 100.

The sensor control unit 211 may drive the humidity sensor 160 periodically before the electronic device 100 is flooded to collect humidity information. If the collected humidity information exceeds a reference humidity determining the flooding of the electronic device 100, i.e., it is determined that the electronic device 100 is flooded, the sensor control unit 211 may drive sensors in the electronic device to collect state information of the electronic device 100 at the time of flooding. The sensors driven by the sensor control unit 211 at the time of flooding may include various kinds of sensors obtaining state information of the electronic device 100. Such sensors may include, for example, at least one of a GPS, an acceleration sensor, an illumination sensor, and a gyroscope sensor.

The service state check unit 213 may execute the service state check program 116 to control an organic relationship between programs and devices in the electronic device 100.

In an embodiment, the service state check unit 213 may compare humidity information of the electronic device 100 periodically collected through the humidity sensor 160 and a reference humidity determining flooding stored in the memory 110. If the humidity information collected through the humidity sensor 160 exceeds the reference humidity, the service state check unit 213 may determine the flooding of the electronic device 100 and may operate sensors through the sensor control unit 211.

Additionally, the state information of the electronic device 100 collected at the time of flooding may be stored in the memory 110. In an embodiment of a method of controlling power when the electronic device 100 is flooded, a power management program 114 that is stored in the memory 110 may cause the power management unit 215 to manage the power supply of the electronic device 100.

The power management unit 215 may control power supply of the electronic device 100 by executing the power management program 114.

In an embodiment, the power management unit 215 may manage power supplied to the electronic device 100 according to power management information stored in the memory 110. Additionally, when it is determined that the electronic device 100 is flooded, the power management unit 215 may edit a power management procedure of the electronic device 100 according to information set in the memory 110 and then, stores the edited power management procedure in the memory 110. The modified power management procedure is stored in the memory 110 through the power management program 114 and is performed through the PMIC 140.

In the above embodiment, the electronic device 100 may collect humidity information of the electronic device 100 from the humidity sensor 160 of the sensor unit through the processor 122 including the sensor control unit 211 and the service state check unit 213, and then may compare the collected humidity information with the reference humidity to determine the flooding of the electronic device 100.

In another embodiment, if it is determined that the electronic device 100 is flooded, the electronic device 100 may collect state information of the electronic device 100 at the time of flooding from sensors (e.g., a GPS, an illumination sensor, a gyroscope sensor, an acceleration sensor, etc.) of the sensor unit through the processor 122 including the sensor control unit 211 and the service state check unit 213, and then may store the collected state information in the memory 110 in addition to the date and time information of the electronic device 100.

In another embodiment, when it is determined that the electronic device 100 is flooded, the power management unit 215 may edit a power management procedure of the power management program through the processor 122 including the sensor control unit 211 and the service state check unit 213. Then, the edited power management procedure may be stored in the memory 110, and may be performed through the PMIC 140.

Although the sensor control program 211, the service state check unit 213, and the power management unit 215 configured in the processor 122 are described as separate parts to help with understanding an operation of the processor 122, the components within the processor 122 may not be separate or clearly physically distinguishable.

Figure 3B:
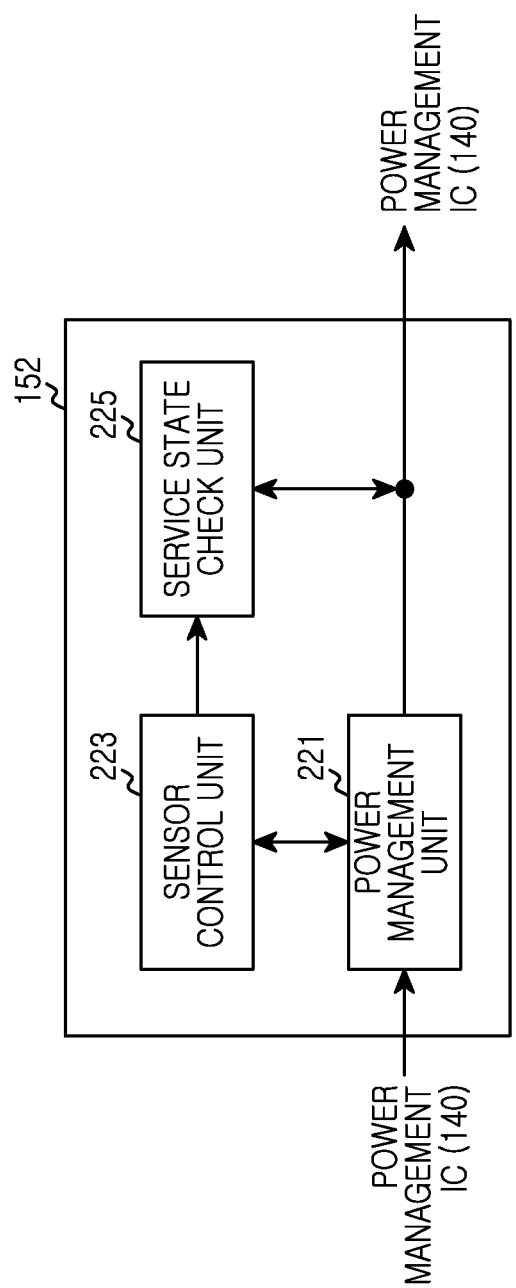
FIG. 3B is a block diagram illustrating a controller operation of an electronic device according to an embodiment of the present disclosure.

FIG. 3B is a block diagram illustrating an operation of the controller 152 configuring the sensor unit 150 when power is applied to the electronic device 100 according to an embodiment of the present disclosure.

As shown in FIG. 3B, the controller 152 may include a power management unit 221, a sensor control unit 223, and a service state check unit 225.

The power management unit 221 may control power supply of the sensor unit 150 and the humidity sensor 160. Also, the power management unit 221 may be connected to the memory 110 to execute the power management program 114.

In an embodiment, the power management unit 221 may detect that power connection to the electronic device 100 is attempted and the PMIC 140 delays processing of a signal for supplying power to the processor 122 and devices, and then may control the sensor control unit 223 to drive the humidity sensor 160.

Additionally, the power management unit 221 may control the PMIC 140 to process the signal that delays power supply to the processor 122 and devices or cut off power to the electronic device 100 according to power supply determined based on the humidity information of the electronic device collected from the humidity sensor in the service state check unit 225.

The sensor unit 223 may control sensors in the electronic device 100. Also, sensor unit 223 may be connected to the memory 110 to execute the sensor control program 115.

In an embodiment, when the power management unit 221 detects that power supply to the electronic device 100 is delayed, the sensor control unit 221 may drive the humidity sensor 160 to collect humidity information.

The service state check unit 225 may control an organic relationship between programs and devices in the electronic device 100. Also, service state check unit 225 may be connected to the memory 110 to execute the service state check program 116.

In an embodiment, the service state check unit 225 may determine whether humidity information of the electronic device 100 collected through the humidity sensor 160 is within a reference humidity range available for the electronic device 100 through comparison. If the humidity information of the electronic device 100 is within the reference humidity range, the power management unit 221 may process a power supply signal normally, which is delayed by the PMIC 140, to supply power to the electronic device 100. If the humidity information of the electronic device 100 is not within the reference humidity range, the power management unit 221 cuts off power to the electronic device 100.

In the above embodiment, the electronic device 100 may detect that the PMIC 140 delays a signal for supplying power to the electronic device 100 through the controller 152 including the power management unit 221.

In another embodiment, when it is detected that power supply is delayed, the electronic device 100 may measure its humidity and determine whether to supply power through the controller 152 including the sensor control unit 223 and the service state check unit 225.

In another embodiment, when it is detected that power supply is delayed, the electronic device 100 may process a power supply signal held by the PMIC 140 or cut off power through the controller 152 including the service state check unit 225 and the power management unit 221.

Figure 4A:
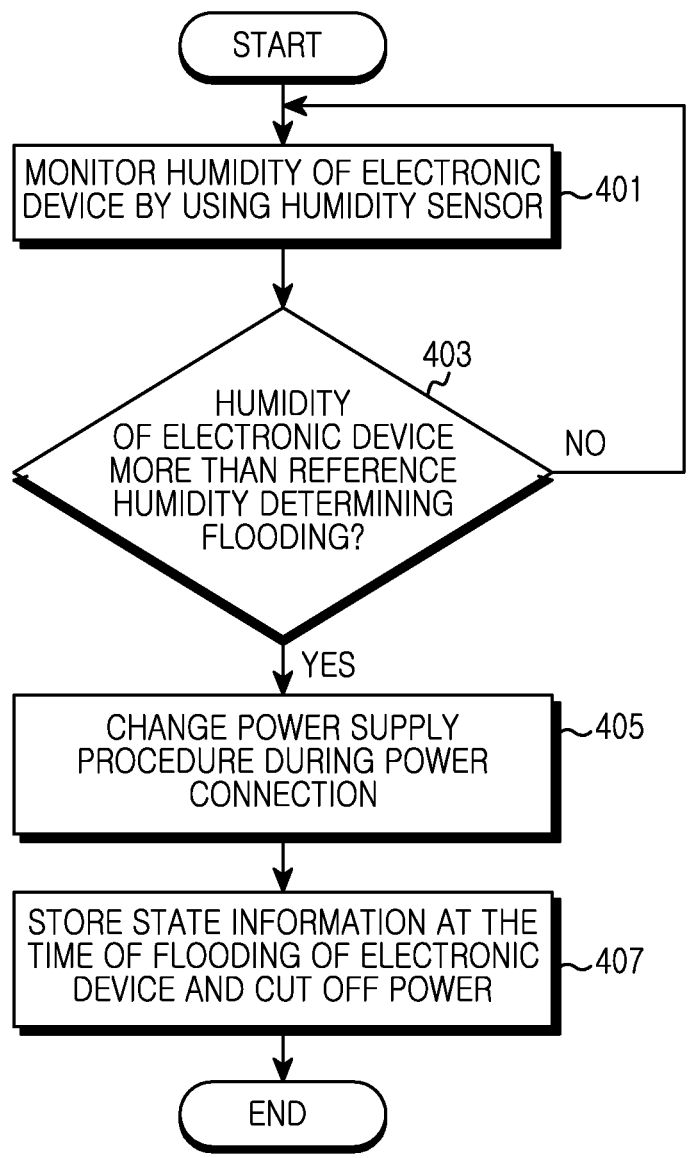
FIG. 4A is a flowchart illustrating a process of storing data and managing power supply when an electronic device is flooded according to an embodiment of the present disclosure.

FIG. 4A is a flowchart illustrating a process of storing data and managing power supply when the electronic device 100 is flooded according to an embodiment of the present disclosure.

In general, a method of determining whether the electronic device 100 is flooded may include a method of using discoloration of a liquid contact indicator due to humidity at the time of flooding and a method of using the humidity sensor 160.

When the humidity sensor 160 is used to determine the flooding, the processor 122 may store state information of the electronic device 100 at the time of flooding in the memory 110 so that it may provide more objective information.

Furthermore, while the electronic device 100 after the flooding is not dried enough to receive power, if power is applied to the electronic device 100, additional damage may occur in a circuit or device. Accordingly, when power is applied to the electronic device 100 after the flooding, a method of preventing an additional damage of the electronic device 100 is required.

According to an embodiment of the present disclosure, the humidity sensor 160 may collect humidity information around the electronic device 100. When it is determined that the electronic device 100 is in a flooded state, a signal system is changed so that power is supplied to the waterproofed controller 152 that is capable of independently operating sensors when power is applied after the flooding. State information at the time of flooding of the electronic device is collected and stored in the memory 110.

Referring to FIG. 4A, the processor 122 may use the humidity sensor 160 to collect humidity information around the electronic device 100 in step 401.

In an embodiment, the processor 122 uses the humidity sensor 160 to periodically measure a humidity of the electronic device 100 (in more detail, around a sensor). In another example, the processor 122 may allow the controller 152 configuring the sensor unit 150 to measure a humidity of the electronic device 100 through the humidity sensor 160. In another example, the controller 152 measures a humidity of the electronic device 100 through a humidity sensor, being independent from a control of the processor 122.

Information measured and digitized by the humidity sensor 160 is stored in the memory 110 as a log, and may be used to determine whether the electronic device 100 is flooded by comparing the measured humidity to a reference humidity through the control of the processor 122 or the controller 152.

In step 403, the processor 122 may determines the flooding of the electronic device 100 by using the collected humidity information.

In an embodiment, when a humidity in a flooded state is defined as 100%, if digitized humidity information exceeds a predetermined critical value n %, the processor 122 determines that the electronic device 100 is flooded. Here, as the critical value n % is defined, if the electronic device 100 is flooded with a humidity of 100%, a circuit may be damaged due to a short circuit. Accordingly, in order to protect a circuit of the electronic device 100 at the time of flooding, it is necessary to determine flooding when the humidity is less than 100%. However, if a predetermined critical value n % of a humidity determining the flooding is too low, even when the electronic device 100 is not actually in a flooded state, this is determined as the flooding. A desired critical value may be defined as 95% to successfully perform the present disclosure.

When a humidity around the electronic device 100 is measured using the humidity sensor 160, if digitized information is less than the critical value n %, step 401 is performed, and if the digitized information is greater than the critical value n %, step 405 is performed.

In step 405, after power is cut off due to the flooding of the electronic device 100, when power is applied to the processor 122 again, the processor 122 may change a power management procedure to control power supply according to a humidity measurement result.

Power may be applied to the electronic device 100 in response to a signal representing a predetermined step (i.e., a procedure). Accordingly, if this step is held, power supply is held not to provide power to a device where signal processing is delayed. In general, in relation to the electronic device 100, power is supplied through a PMIC in a power management unit, and the processor 122 allows the PMIC 140 to add a command for delaying processing of a signal for supplying power to the electronic device 100, so as to prevent power supply.

At this point, if a path is configured through which power is received without passing through the PMIC 140 between the sensor unit 150 and the battery, even if power supply is delayed in the PMIC 140, the sensor unit 150 may receive power from a battery, without passing through the PMIC 140.

With reference to the above method, the processor 122 may change a power management procedure when the flooding of the electronic device 100 is determined, and supply power to the electronic device 100 according to a changed power management procedure when power supply is attempted.

In an embodiment, once power supply is attempted, the processor 122 may change a power management procedure so that the PMIC 140 delays processing of a power supply signal for supplying power to the electronic device 100 and delays power supply signal processing until receiving whether to supply power by using the humidity sensor 160 from the controller 152 of the sensor unit 150 separately performing a function.

When power is supplied to the electronic device 100, the changed power management procedure may be stored in the memory 110 in addition to the firmware or BIOS software that is also stored in the memory 110.

Furthermore, the processor 122 may display the contents about an operation performed in step 405 on the display unit 131.

The processor 122 may perform step 407 after changing the power management procedure in step 405.

In step 407, the processor 122 may store state information of when it is determined that the electronic device 100 is flooded.

In an embodiment, the processor 122 may collect state information of the electronic device 100 periodically by using various kinds of sensors in a sensor unit, and may collect state information of the electronic device 100 from when the flooding of the electric device 100 was determined by the humidity sensor 160.

The information collected and stored of when the electronic device 100 has been flooded may include a variety of information to be used for objectively checking a state of the electronic device 100 at the time of flooding through sensors and devices in the electronic device 100, such as, for example, date and time information at the time of flooding, position information of the electronic device 100 via GPS, information on programs in operation, illumination information around the electronic device 100 collected through an illumination sensor, and movement (e.g., impact, vibration, and/or tilt) of the electronic device 100 via an acceleration sensor and a gyroscope sensor.

The processor 122 may store the collected state information at the time of flooding of the electronic device 100, in the memory 110 which may include at least one data storage unit 112.

In step 407, when storing the state information of the electronic device 100, the processor 122 may terminate the flowchart of FIG. 4A. Additionally, the processor 122 may cut off the power to the electronic device 100 so as to prevent additional damage due to continuous power supply.

Furthermore, the processor 122 may display the contents about an operation performed in step 407, on the display unit 131 before cutting off the power to the electronic device 100.

Figure 4B:
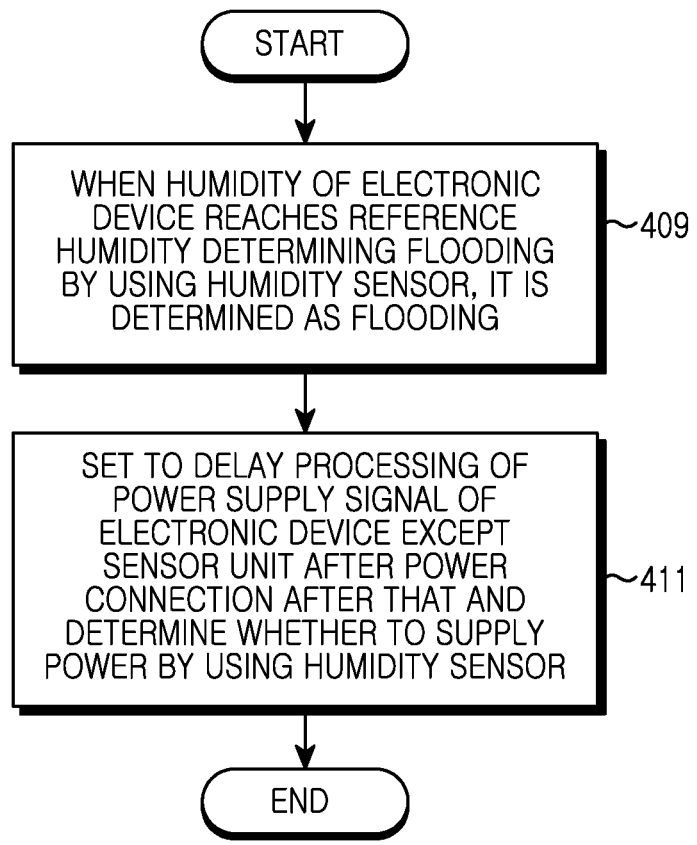
FIG. 4B is a flowchart illustrating a process of storing data and managing power supply when an electronic device is flooded according to an embodiment of the present disclosure.

FIG. 4B is a flowchart illustrating a process of storing data and managing power supply when the electronic device 100 is flooded according to an embodiment of the present disclosure.

Referring to FIG. 4B, the processor 122 may perform step 409 for determining the flooding of the electronic device 100 by using the humidity sensor 160 and step 411 for changing and storing a power management procedure to delay power supply when power supply to the electronic device is attempted and determine whether to supply power by using the humidity sensor 160.

Step 409 for determining the flooding of the electronic device 100 by using the humidity sensor 160 may include step 401 for determining a humidity of the electronic device 100 by using the humidity sensor 160 and step 403 for determining the flooding by comparing the measured humidity information and a reference humidity for determining the flooding of the electronic device 100.

Once power supply to the electronic device is attempted, step 411 for changing a power management procedure to delay power supply and determine whether to supply power by using the humidity sensor 160 may include step 405 for changing a power supply procedure during power connection. Step 405 may change a command for the PMIC 140 to delay processing of a signal for supplying power to the electronic device 100 once power connection is attempted. Step 405 may also or alternatively change a command for the PMIC 140 to supply power to the electronic device 100 or cut off power by receiving a control regarding whether to supply power to the electronic device 100 from the controller 152. The change to the command for the PMIC 140 at step 405 may be stored in the memory 110.

Furthermore, at step 405, a command for the controller 152 may be changed to collect humidity information by using the humidity sensor 160, and to determine whether to supply power to the electronic device 100 by comparing the collected humidity information with a reference humidity available for the electronic device 100 may be further included.

Furthermore, at step 407, the memory 110 may store information such as visual data of the electronic device 100 at the timing of flooding, illumination amount data around the electronic device 100, impact amount data applied to the electronic device 100, vibration amount data of the electronic device 100 corresponding to the impact amount data, acceleration amount data of the electronic device 100 corresponding to the impact amount data, tilt amount data of the electronic device 100, rotational inertia amount data of the electronic device 100, and running application program list data of the electronic device 100 by using sensor such as the humidity sensor 160, a GPS (not shown), a gyroscope sensor (not shown), and an acceleration sensor (not shown), which configure the sensor unit.

Furthermore, the processor 122 may display the contents about operations performed in FIG. 4B on the display unit 131.

Figure 4C:
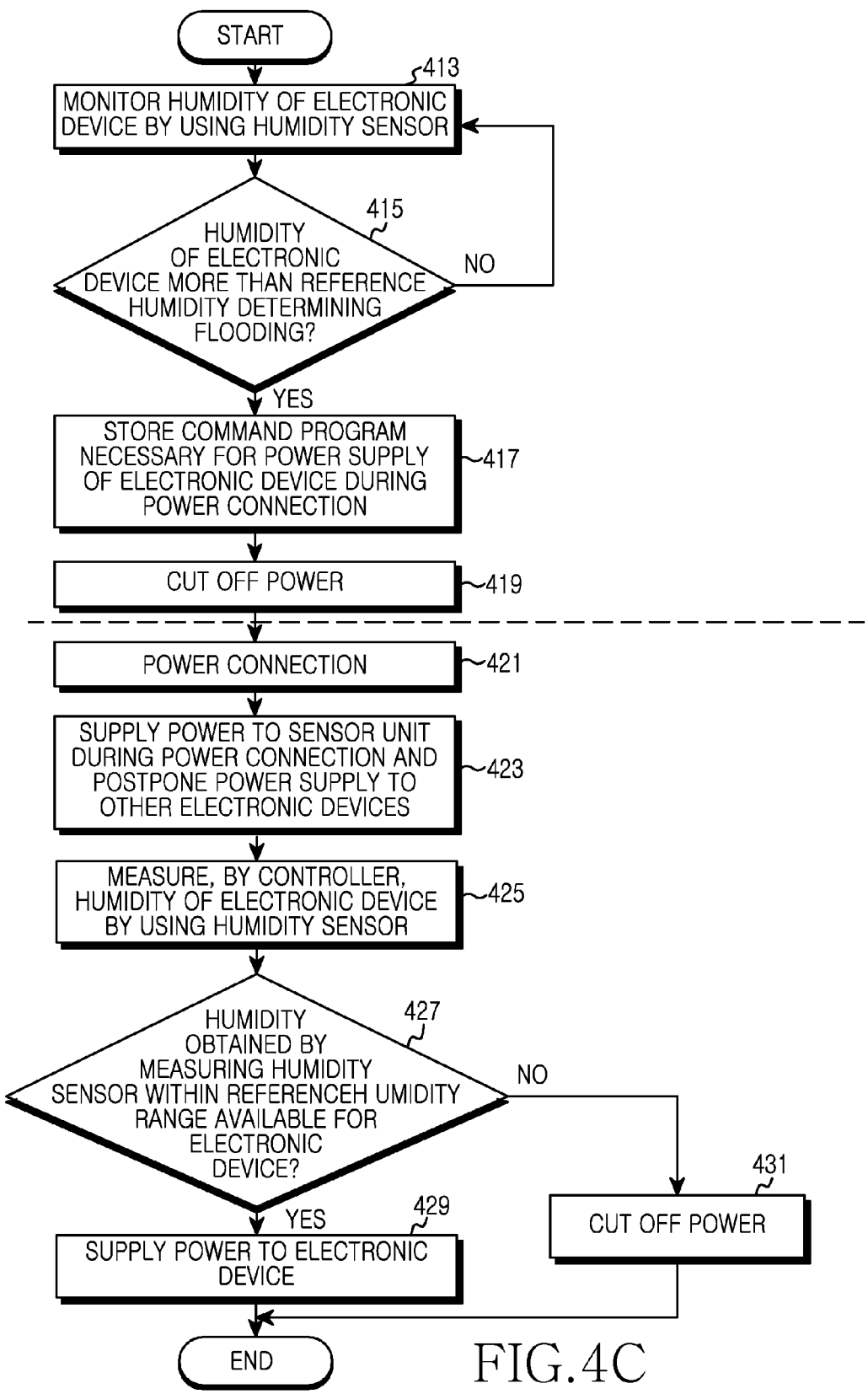
FIG. 4C is a flowchart illustrating a process of storing data and supplying power to an electronic device when the electronic device is flooded according to an embodiment of the present disclosure.

FIG. 4C is a flowchart illustrating a process of storing data and supplying power to the electronic device 100 when the electronic device 100 is flooded according to an embodiment of the present disclosure.

According to an embodiment of the present disclosure, the processor 122 collects humidity information around the electronic device 100. When it is determined that the electronic device 100 is in a flooded state, the processor 122 may collect state information at the time of flooding of the electronic device 100 and may store the collected state information in the memory 110. When power is supplied after the flooding, the processor 122 may supply power to the waterproofed controller 152 that is capable of independently operating sensors. The controller 152 may obtain a humidity of the electronic device 100 by operating the humidity sensor 160, and may compare the humidity with a reference humidity available for the electronic device 100 to determine whether to supply power to the electronic device 100.

Referring to FIG. 4C, the processor 122 uses the humidity sensor 160 to collect humidity information around the electronic device 100 in step 413.

In an embodiment, the processor 122 may use the humidity sensor 160 to periodically measure a humidity of the electronic device 100. In another embodiment, the processor 122 may allow the controller 152 configuring the sensor unit 150 to measure a humidity of the electronic device 100 through the humidity sensor 160. In another embodiment, the controller 152 may measure a humidity of the electronic device 100 through a humidity sensor, which is independent from a control of the processor 122.

Information measured and digitized by the humidity sensor 160 may be stored in the memory 110 as a log, and may be used to determine whether the electronic device 100 is flooded by comparing the measured humidity to a predetermined reference humidity such that the processor 122 or the controller 152 may determine flooding.

The processor 122 may measure a humidity of the electronic device 100 and proceeds to step 415.

In step 415, the processor 122 may determine the flooding of the electronic device 100 by using the collected humidity information.

In an embodiment, if it is assumed that a humidity of a flooded state is 100%, when the digitized humidity information is greater than a predetermined critical value n %, the processor 122 determines that the electronic device 100 is flooded. Here, a desirable critical value n % is defined as 95% like step 403.

When a humidity around the electronic device 100 is measured using the humidity sensor 160, if the digitized information is less than the critical value n %, step 413 is performed, and if the digitized information is greater than the critical value n %, step 417 is performed.

In step 417, the processor 122 may store information necessary for supplying power to the electronic device 100 when power is supplied again after power cutoff.

The processor 122 determines the flooding of the electronic device 100 when the humidity obtained using the humidity sensor 160 is equal to or greater than the reference humidity n % determining the flooding. The processor 122 of the electronic device 100 determined as flooded may store in the memory 110 information processed to supply power only if the a humidity of the electronic device 100 is the reference humidity available for the electronic device 100, as power is applied again after power cutoff before power to the electronic device 100 is cut off.

In an embodiment, the stored information may be a command for the controller 152 to determine power supply of the electronic device 100 by using the humidity sensor 160 if no power is supplied to the processor 122 during power connection of the electronic device 100, or information indicating whether the electronic device 100 is flooded.

At this point, the memory 110 storing information may be a memory where firmware or BIOS processed first of all is stored when power is applied to the electronic device 100, or a memory connected to the controller 152 determining information that indicates whether the electronic device 100 is flooded.

Furthermore, although not shown in the drawings, the processor 122 may proceed to step for storing state information of when it is determined that the electronic device 100 is flooded.

The information collected and stored when the electronic device 100 is flooded includes a variety of information used for objectively checking a state of the electronic device 100 at the time of flooding through sensors and devices in the electronic device 100, such as date and time information at the time of flooding, position information of the electronic device 100 via GPS, information on programs in operation, illumination information around the electronic device 100 collected through an illumination sensor, and movement (e.g., impact, vibration, and tilt) of the electronic device 100 via an acceleration sensor and a gyroscope sensor.

The processor 122 may store the collected state information at the time of flooding of the electronic device 100, in the memory 110. Here, the memory 110 may be at least one data storage unit 112 in the electronic device 100.

Furthermore, the processor 122 may display the contents about an operation performed in step 417, on the display unit 131 before cutting off the power to the electronic device 100.

Additionally, the processor 122 may cut off the power to the electronic device 100 so as to prevent 419 additional damage that may result from a continuous supply of power to the electronic device 100.

In step 421, restoration of a power connection to the electronic device 100 after power has been cut off is attempted again.

In an embodiment, the power connection of the electronic device 100 may be accomplished by normally manipulating a device for power connection of the electronic device 100. Also, due to a short circuit of a circuit or device, or physical, programmatic, and systematic malfunctions of a device for power connection, the power connection of the electronic device 100 may be accomplished. That is, there are various cases for the power connection of the electronic device 100.

Once power connection to the electronic device 100 is attempted in step 421, step 423 starts.

In step 423, when power is supplied after the flooding of the electronic device 100, the PMIC 140 may supply power to the sensor unit, and delays power to the processor 122 and the remaining electronic devices.

In an embodiment, when power connection to the electronic device 100 is attempted, power management unit 215 may delay processing of a signal for supplying power to the processor 122 and the remaining electronic devices so as to postpone power supply. If an independent path is configured for receiving power between the waterproofed controller 152 and the battery 170 without passing through the processor 122, the controller 152 may receive power from the battery 170 via the independent path to perform a function.

In another embodiment, if a path for receiving power through the PMIC 140 configuring the power management unit between the controller and the battery without passing through the processor 122 is designed, once power connection to the electronic device 100 is attempted, the power management unit including PMIC 140 delays processing of a signal for supplying power to the processor 122 and the remaining electronic devices so as to postpone power supply and then, supplies power to the controller 152. The waterproofed controller 152 may receive battery power from the PMIC 140 to perform a function.

Once power is supplied to the controller 152 configuring the sensor unit 150, it is possible to proceed to step 425.

In step 425, the controller 152 uses the humidity sensor 160 to collect humidity information of the electronic device 100.

While no power is supplied to the processor 122 and the remaining electronic devices except for the sensor unit 150 controlling sensors, the controller 152 configuring the sensor unit 150 may determine whether to supply power on the basis of the state of the electronic device 100.

In an embodiment, when power connection to the electronic device 100 is attempted and the PMIC 140 delays processing of a signal for supplying power to the electronic device 100 to postpone power supply, the controller 152 may use the humidity sensor 160 according to a command of a program stored in the memory 110 in step 417, so as to collect humidity information of the electronic device 100.

In another embodiment, when power connection to the electronic device 100 is attempted and the PMIC 140 delays processing of a signal for supplying power to the electronic device 100 to postpone power supply, the controller 152 allows the PMIC 140 to supply the delayed power to the electronic device 100 when the stored information is not the flooding on the basis of the information indicating whether the electronic device 100 is flooded, which is stored in the memory 110 in step 417, and uses the humidity sensor 160 to collect humidity information of the electronic device 100 when the stored information is the flooding.

In further embodiment, when power connection to the electronic device 100 is attempted and the PMIC 140 delays processing of a signal for supplying power to the electronic device 100 to postpone power supply, the controller 152 may detect that the PMIC 140 delays signal processing or power is not supplied to the processor 122 and the remaining electronic devices, and then, uses the humidity sensor 160 to collect humidity information of the electronic device 100.

The controller 152 may use the humidity sensor 160 to collect humidity information of the electronic device 100, and then proceeds to step 427.

In step 427, the controller 152 determines power supply to the electronic device by using information collected through the humidity sensor 160.

In an embodiment, the controller 152 may compare the humidity information of the electronic device 100 collected by the humidity sensor 160 with a humidity of a flooded state (e.g., a humidity is 95% or more) and then, if the humidity is not removed enough to operate the electronic device 100 normally as power is received, the PMIC 140 performs step 431 for cutting off power to the electronic device 100 and terminates all steps of FIG. 4C.

In an embodiment, the controller 152 compares the collected humidity information of the electronic device 100 with a humidity of a flooded state (e.g., a humidity is 95% or more) and then, if the collected humidity information is within a reference humidity range available for the electronic device 100, the PMIC 140 processes a signal that was delayed not to supply power to the processor 122 and the remaining electronic device, so that step 429 for supplying power to the electronic device 100 may be performed and all steps of FIG. 4C may be terminated.

In step 429, once power is supplied to the electronic device 100 normally, the processor 122 may execute the service state check program 116 to check the contents about operations performed after the flooding of the electronic device 100 (e.g., power is cut off in the electronic device 100 through an abnormal method before step 431, or although power connection to the electronic device 100 is attempted, this is determined as an abnormal connection in step 427 and thus power is cut off), so as to display 607 and 609 the contents on the display unit 131.

In step 431, the controller 152 uses the PMIC 140 to cut off power supply to the electronic device 100.

In an embodiment, if humidity information collected by the humidity sensor 160 is greater than a reference humidity available for the electronic device 100, the controller 152 may cut off power to prevent the electronic device 100 from being damaged such as a short circuit of a circuit due to humidity.

The controller 152 may not process a signal for supplying power to the electronic device 100, which is delayed by the PMIC 140, so that it cuts off power supply to the controller 152 and the electronic device 100.

Additionally, when a path for directly receiving power between the controller 152 and the battery without passing through the processor 122 or the PMIC 140 is designed, the controller 152 may cut off power by itself.

Figure 5A:
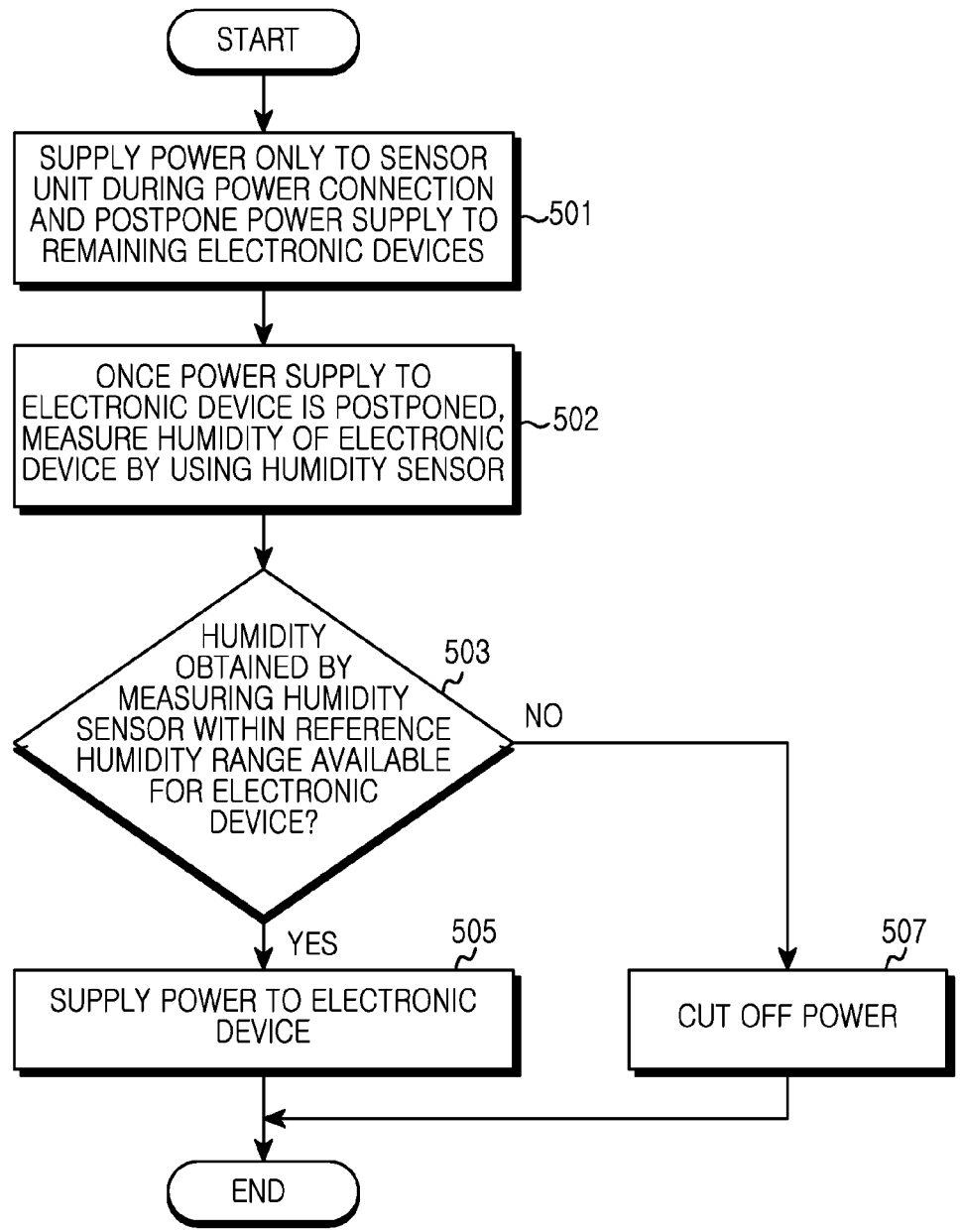
FIG. 5A is a flowchart illustrating a process of managing power supply when power is applied to an electronic device after flooding according to an embodiment of the present disclosure.

FIG. 5A is a flowchart illustrating a process of managing power supply when power is supplied after the flooding of the electronic device 100 according to an embodiment of the present disclosure.

Once power is supplied to a circuit while the electronic device 100 is determined as flooded, flooded circuits or devices may be damaged due to a short circuit. Accordingly, when power is supplied after the flooding of the electronic device 100, it is desirable to determine whether the humidity is removed enough to supply power to the electronic device 100.

According to an embodiment of the present disclosure, when power is supplied after the flooding, the processor 122 delays processing of a signal for supplying power to the electronic device 100 according to a power connection method changed before the flooding, and receives power from the battery independently to operate humidity sensor 160 through the waterproofed controller 152 performing a function without a control of the processor 122. Then, the humidity sensor 160 may collect humidity information of the electronic device 100 so that power may be supplied to the electronic device 100 only when the humidity is removed enough to supply power to the electronic device 100.

Referring to FIG. 5A, in step 501, when power is supplied after the flooding of the electronic device 100, the PMIC 140 supplies power to the sensor unit 150, and may delay power supply to the processor 122 and the remaining electronic devices.

In an embodiment, when power connection to the electronic device 100 is attempted, a power management unit including the PMIC 140 delays processing of a signal for supplying power to the processor 122 and the remaining electronic devices so as to postpone power supply. If an independent path is configured to receive power between the waterproofed controller 152 and the battery 170 without passing through the processor 122, the controller 152 may receive power from the battery 170 via the independent path to perform a function.

In another embodiment, if a path for receiving power through the PMIC 140 configuring the power management unit between the controller and the battery without passing through the processor 122 is configured, once power connection to the electronic device 100 is attempted, the power management unit including PMIC 140 may delay processing of a signal for supplying power to the processor 122 and the remaining electronic devices so as to postpone power supply and then, supplies power to the controller 152. The waterproofed controller 152 may receive battery power from the PMIC 140 to perform a function.

Once power is supplied to the controller 152 configuring the sensor unit 150, it is possible to proceed to step 502.

In step 502, the controller 152 may use the humidity sensor 160 to collect humidity information of the electronic device 100.

When the controller 153 drives the humidity sensor 160 to measure a humidity of the electronic device 100, in order to prevent an unnecessary procedure for measuring humidity each time power is supplied to the controller after power is supplied to the electronic device 100, a procedure for determining that power connection may be attempted while the electronic device 100 is in a flooded state is required.

In an embodiment, when a power connection to the electronic device 100 is attempted and the PMIC 140 delays processing of a signal for supplying power to the electronic device 100 to postpone power supply, the controller 152 detects that the PMIC 140 has delayed signal processing or that power is not being supplied to the processor 122 and the remaining electronic devices, and then, uses the humidity sensor 160 to collect humidity information of the electronic device 100.

In another embodiment, when the memory 110 is connected to the controller 152, the processor 122 may store information on at the time of flooding of the electronic device 100. When power connection to the electronic device 100 is attempted and the PMIC 140 delays processing of a signal for supplying power to the electronic device 100, the controller 152 may read information on the flooding from the memory 152. If the electronic device 100 is flooded, the controller 152 may use the humidity sensor 160 to collect humidity information of the electronic device 100, and if not, the PMIC 140 normally supplies the power of the electronic device 100 held by delaying processing of a power supply signal in step 505.

The controller uses the humidity sensor 160 to collect humidity information of the electronic device 100, and then proceeds to step 503.

In step 503, the controller 152 may determine power supply to the electronic device by using information collected through the humidity sensor 160.

Even when power is not supplied to the processor 122 in a flooded state of the electronic device 100, the waterproofed controller 152 may receive power from the battery to operate the humidity sensor 160. Therefore, when power is supplied in a power off state after the electronic device 100 is flooded, whether power is supplied normally after the humidity of the electronic device 100 is removed or power is supplied due to a short circuit of a circuit or device or physical malfunction of a power button when there is a humidity in the electronic device 100 is determined based on the humidity of the electronic device 100 measured by the humidity sensor 160, and then a determination whether to supply power may be made.

In an embodiment, the controller 152 may compare the humidity information of the electronic device 100 collected by the humidity sensor 160 with a humidity of a flooded state (e.g., a humidity is 95% or more) and then, if the humidity is not removed enough to operate the electronic device 100 normally as power is received, the PMIC 140 may perform step 507 for cutting off power to the electronic device 100 and terminates all steps of FIG. 5A.

In an embodiment, the controller 152 may compare the collected humidity information of the electronic device 100 with a humidity of a flooded state (e.g., a humidity is 95% or more) and then, if the collected humidity information is within a reference humidity range available for the electronic device 100, the PMIC 140 may process a signal that was delayed not to supply power to the processor 122 and the remaining electronic device, so that step 505 for supplying power to the electronic device 100 may be normally performed and all steps of FIG. 5A may be terminated.

In step 507, the controller 152 uses the PMIC 140 to cut off power supply to the electronic device 100.

In an embodiment, if humidity information collected by the humidity sensor 160 is greater than a reference humidity available for the electronic device 100, the controller 152 cuts off power to prevent the electronic device 100 from being damaged such as a short circuit of a circuit due to humidity.

The controller 152 may not process a signal for supplying power to the electronic device 100, which is delayed by the PMIC 140 so that it cuts off power supply to the controller 152 and the electronic device 100.

Additionally, when a path for directly receiving power between the controller 152 and the battery without passing through the processor 122 or the PMIC 140 is designed, the controller 152 may cut off power by itself.

Figure 5B:
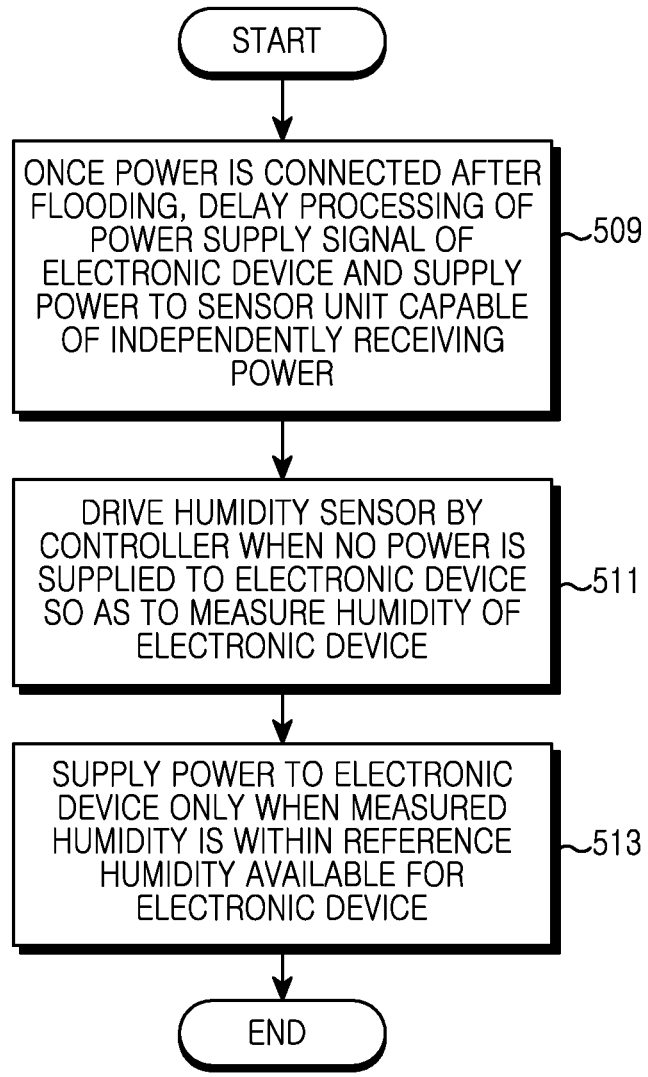
FIG. 5B is a flowchart illustrating a process of managing power supply when power is applied to an electronic device after flooding according to an embodiment of the present disclosure.

FIG. 5B is a flowchart illustrating a process of managing power supply when power is connected after the flooding of the electronic device 100 according to an embodiment of the present disclosure.

Referring to FIG. 5B, the flowchart includes step 509, step 511, and step 513. In step 509, the PMIC 140 supplies power to the controller 152 and postpones power supply to the processor 122 and the remaining electronic device when power connection to the electronic device 100 is attempted. In step 511, the controller 152 collects humidity information of the electronic device 100 by using the humidity sensor 160 when power is not supplied to the electronic device 100. In step 531, the controller 152 allows the PMIC 140 to supply power to the electronic device 100 only when the measured humidity information is within a reference humidity available for the electronic device 100.

Step 509 in which the PMIC 140 supplies power to the controller 152 and postpones power supply to the processor 122 and the remaining electronic device when power connection to the electronic device 100 is attempted may include step 501 in which the controller 152 receive power directly from the battery 170 or the PMIC 140 once power connection to the electronic device 100 is attempted and step 501 in which the PMIC 140 delays processing of a signal for supplying power to the processor 122 and the remaining electronic device to postpone power supply.

Step 511 in which humidity information of the electronic device is collected by the humidity sensor 160 if no power is supplied to the electronic device 100 may include: step 502 in which the controller receiving power detects that no power is supplied to the processor 122 and the remaining electronic device, step 502 in which the humidity sensor 160 is driven even when no power is supplied to the processor 122 and the remaining electronic device, and/or step 502 in which a humidity of the electronic device 100 is measured using the humidity sensor 160.

Furthermore, when the controller 152 is connected to the memory 110, the flowchart of FIG. 5B may further include step 502 in which the controller 152 determines whether the electronic device 100 is flooded on the basis of information stored in the memory 110, step 502 in which the controller collects humidity information of the electronic device 100 by using the humidity sensor 160 if the electronic device 100 is flooded, and step 502 in which the controller 152 allows the PMIC 140 to supply power to the electronic device 100 if the electronic device 100 is not flooded.

When measured humidity information is within a reference humidity available for the electronic device 100, step 513 for supplying power to the electronic device 100 may include step 503 in which the controller 152 compares the humidity of the electronic device with the reference humidity available for the electronic device 100, step 507 in which the PMIC 140 cuts power off if the humidity of the electronic device 100 is greater than the reference humidity, and step 505 in which the PMIC 140 supplies power to the electronic device 100 normally if the humidity of the electronic device 100 is less than the reference humidity.

Figure 6A:
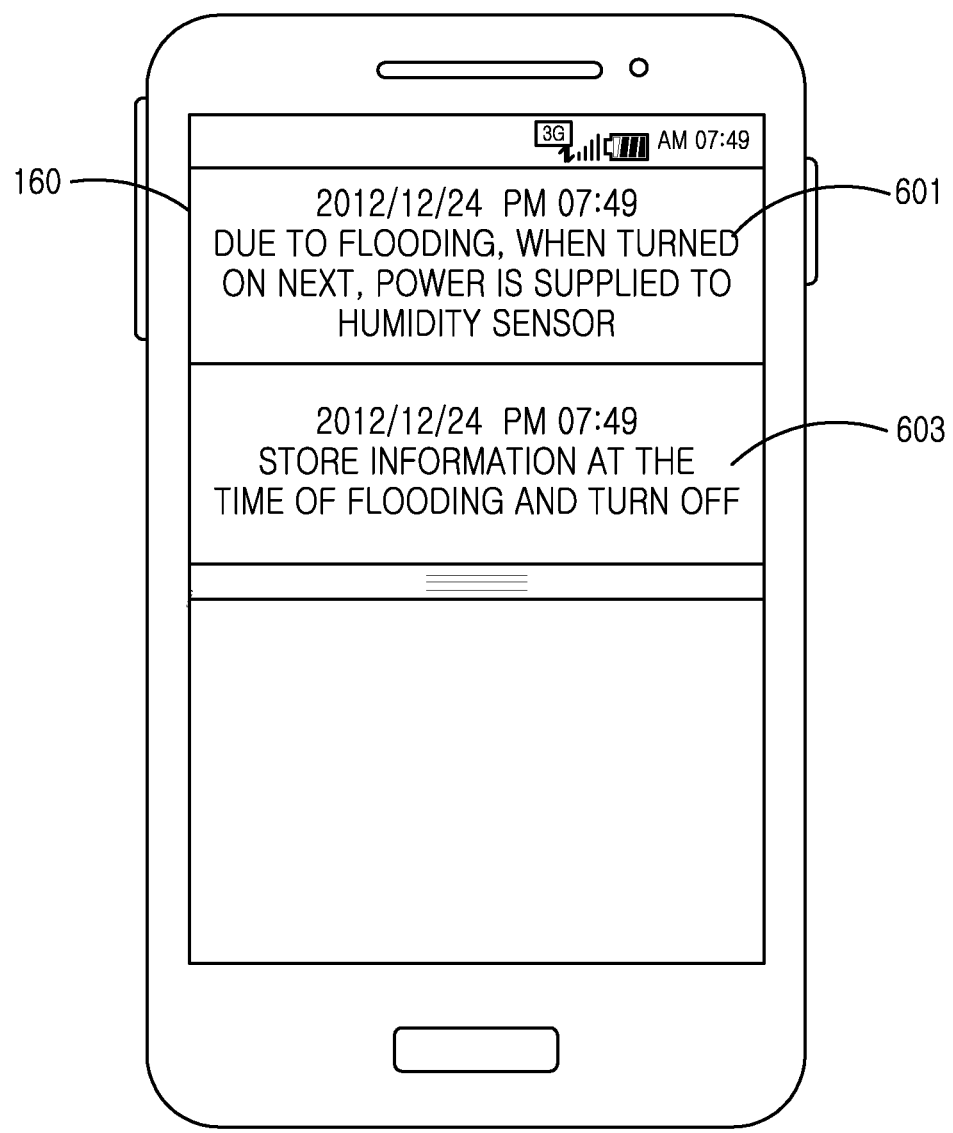
FIG. 6A is a view of when contents on an operation performed are displayed on a display unit in an electronic device according to an embodiment of the present disclosure.

FIG. 6A is a view of when contents about an operation performed are displayed on a display unit in the electronic device 100 according to an embodiment of the present disclosure.

As shown in FIG. 6A, when power is supplied normally after the flooding of the electronic device 100, the processor 122 displays on the display unit 131 information on the contents about operations performed from at the time of flooding of the electronic device 100, so that the operations of the electronic device 100 at the time of flooding may be easily checked.

For example, when next power is supplied after the flooding of the electronic device 100, the processor 122 is set to postpone power supply to the processor 122 and the remaining electronic device except the controller 153. Date and time information relating to this setting and contents about operations performed are displayed 601 on the display unit 131 of the electronic device 100 after the humidity of electronic device 100 is removed and power is supplied normally.

In another embodiment, when state information on at the time of flooding of the electronic device 100 is measured and stored using sensors of a sensor unit, the processor 122 may display 603 on the display unit 131 date and time information relating to this operation, contents about measured and stored information, or results for saving, after the humidity of the electronic device 100 is removed enough to receive power normally.

Figure 6B:
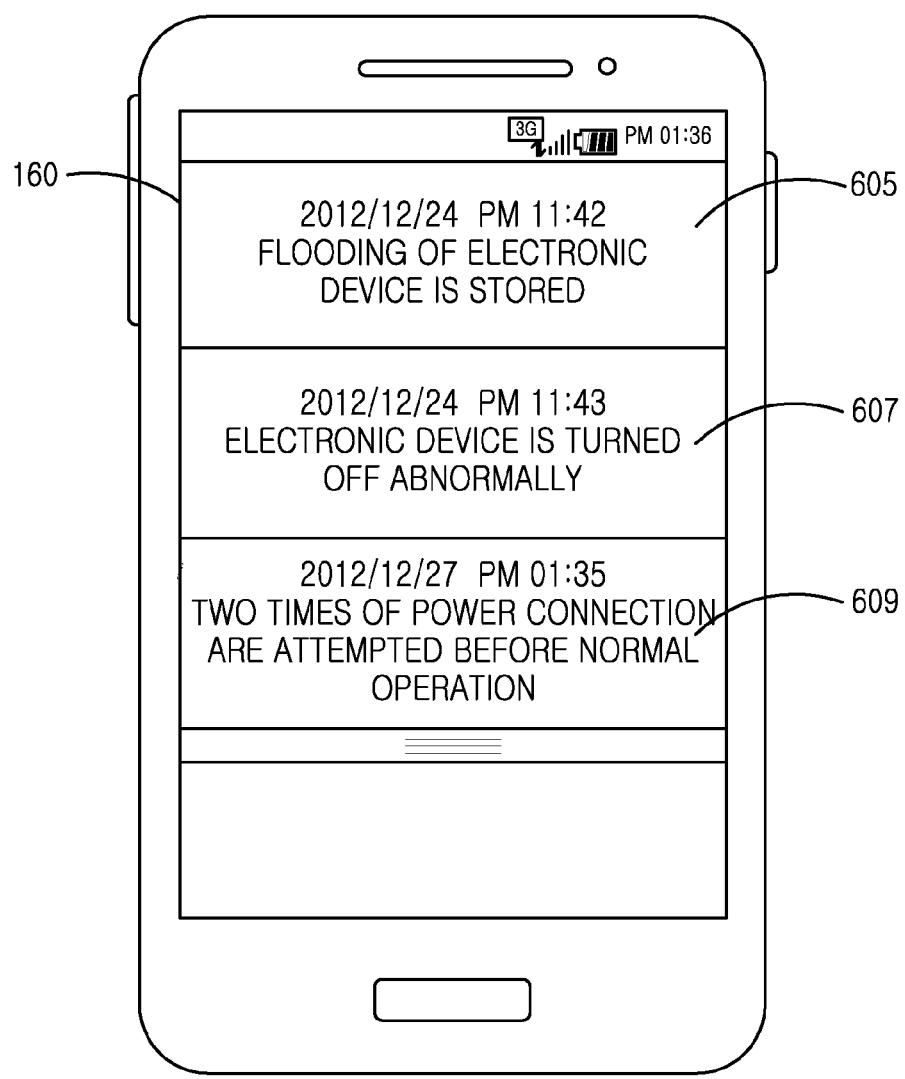
FIG. 6B is a view of when contents on an operation performed are displayed on a display unit in an electronic device according to an embodiment of the present disclosure.

FIG. 6B is a view of when contents about an operation performed are displayed on a display unit in the electronic device 100 according to another embodiment of the present disclosure.

As shown in FIG. 6B, when power is supplied normally after the flooding of the electronic device 100, the processor 122 may display on the display unit 131 information on the contents about operations performed from at the time of flooding of the electronic device 100 to the normal power supply after the humidity of the electronic device 100 is removed, so that the operations of the electronic device 100 at the time of flooding may be easily checked.

In an embodiment, when next power is supplied after the flooding of the electronic device 100, the processor 122 stores information on the flooding of the electronic device 100 in the memory 110 so that the controller detects the flooding through the information stored in the memory 110, and displays the stored contents on the display unit 131 of the electronic device 100 after the humidity of the electronic device 100 is removed.

In another example, when the electronic device 100 is flooded, like steps 431 and 507, if the electronic device 100 is turned off and power is cut off through an abnormal procedure by the processor 122, e.g., power cutoff due to battery removal and a short circuit, contents about the abnormal termination may be displayed on the display unit 131 of the electronic device 100 after the humidity of the electronic device 100 is removed and power is supplied normally.

In another embodiment, when power is cut off at the timing of flooding and power is supplied again, if it is determined that power is supplied to the controller 152 with the humidity not removed, contents about power connection attempt before power is supplied normally after the humidity of the electronic device 100 is removed may be displayed on the display unit 131 of the electronic device 100 after the humidity of the electronic device removed and power is supplied normally.

Figure 7:
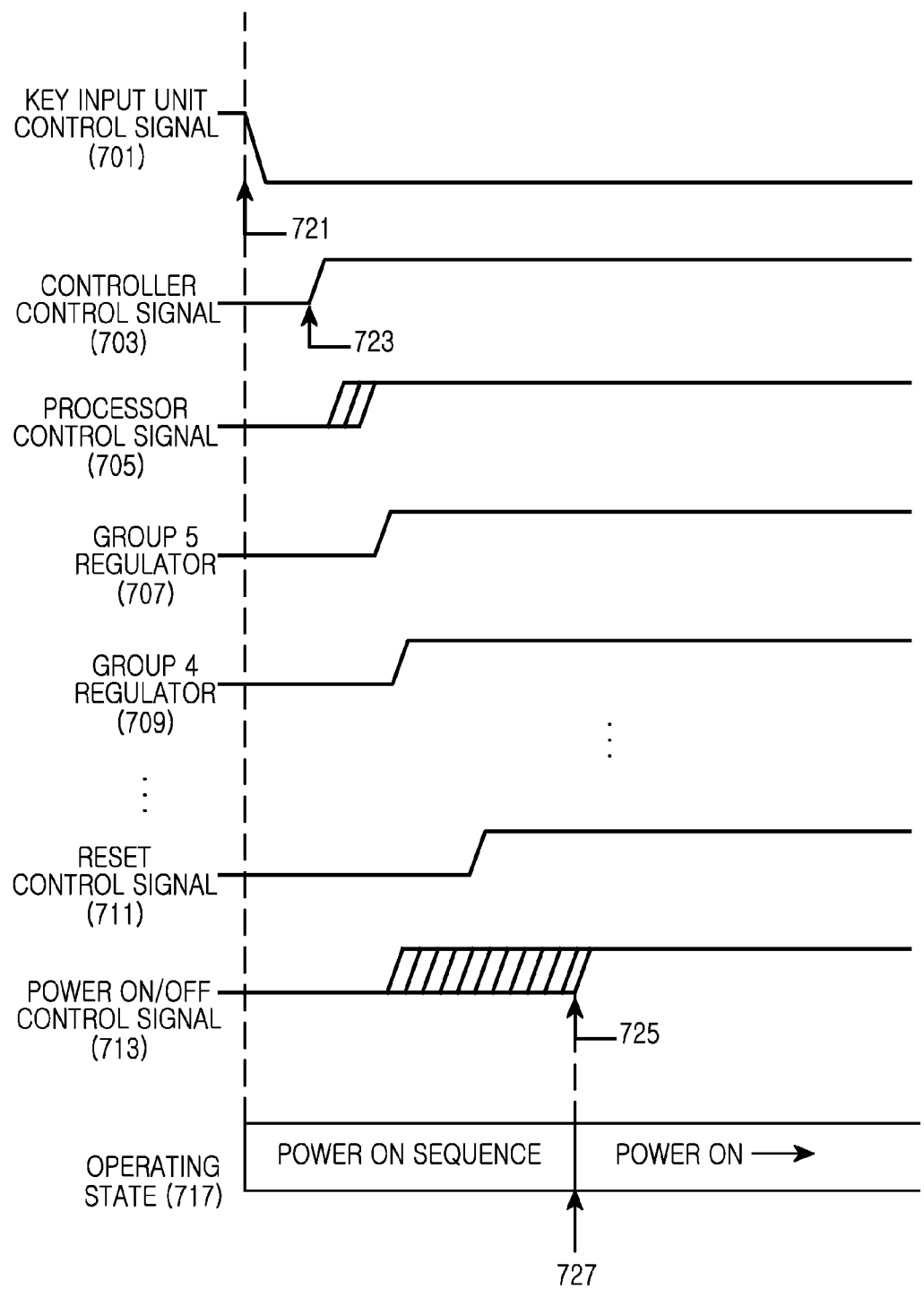
FIG. 7 is a view illustrating a power applying process of an electronic device according to an embodiment of the present disclosure.

FIG. 7 is a view illustrating a power applying process of the electronic device 100 according to an embodiment of the present disclosure.

Referring to FIG. 7, if it satisfies all predetermined conditions in applying power, the electronic device 100 may perform a power applying sequence operation.

The electronic device 100 may operate a power applying sequence by inputting 721 a power applying signal 701, check an operating state of the controller 152 through a control signal 703 of the controller 152, check an operating state of the processor 122 through a control signal 705 of the processor 122, check a control signal 707 or 709 of a regulator controlling the occurrence of a voltage operating peripheral devices, prepare normal operations of the controller 152, the processor 122, and peripheral devices through a reset control signal 701, and supply power to the processor 122, the controller 152, and the peripheral devices of the electronic device 100 through a power on/off control signal 713.

The PMIC 140 of the electronic device 100 may check a state of the electronic device 100 by transmitting/receiving a signal for checking an operating state between the processor 122, controller 152, and peripheral devices of the electronic device 100.

According to an embodiment of the present disclosure, when the electronic device 100 is flooded and power supply is attempted, the electronic device 100 may obtain a humidity state of the electronic device 100 through the humidity sensor 160 by applying power to the controller 152, and supplying power to the processor 122 and the peripheral device when the humidity state of the electronic device 100 is within a range in which power can be applied.

After the flooding, if power supply is attempted through a power button of the electronic device 100, the PMIC 140 of the electronic device 100 may determine whether the processor 122, the controller 152, and peripheral devices of the electronic device 100 operate normally through a control signal or a response signal.

The controller 152 may receive power from the battery 170 through a channel independent from channels of the processor 122 and the peripheral devices, and when power supply to the electronic device 100 is attempted, an operation of the controller 152 may be checked first. In relation to a power applying sequence, by not transmitting a control signal (or a response signal) of the controller 152 of the controller 152 during an operation for checking control signal 723 of the controller 152, a verification process of the control signal 705 of the processor 122 may be postponed, and the controller 152 receiving power via an independent channel may control the humidity sensor 160.

When information on a flooded state of the electronic device 100 or information on the flooding is stored in the memory 110, the controller 152 may check whether the electronic device 100 is flooded and if it is determined that the electronic device 100 is flooded, may check a humidity of the electronic device 100.

When information on the flooding of the electronic device 100 is stored in the memory 110, the controller 152 may check the memory 110, and if there is no information on the flooding, the controller 152 transmits the control signal 701 or a signal for continuous power applying sequence of the electronic device 100 to the PMIC 140.

When the humidity of the electronic device 100 obtained through the humidity sensor 160 is within a reference humidity range available for the electronic device 100, the controller 152 may transmit the control signal 701 or a signal for continuous power applying sequence of the electronic device 100 to the PMIC 140.

When the humidity of the electronic device 100 obtained through the humidity sensor 160 is not within the reference humidity range available for the electronic device 100, the controller 152 may not transmit the control signal 701 to the PMIC 140 or does not process a power applying sequence of the electronic device 100 but transmits a signal for cutting off power to the electronic device 100.

The PMIC 140 may check a control signal from the processor 122, the controller 152, and the peripheral devices, and when all the control signals are determined as normal, supplies power 727 to the electronic device 100 by transition (or triggering) 725 of the power on/off control signal 713.

If the PMIC 140 does not receive the control signal 701 from the controller 152, or does not progress a power applying sequence of the electronic device 100 anymore, or receives a signal for cutting off power to the electronic device 100, power supply to the electronic device 100 is cut off according to a procedure.

Methods according to embodiments listed in the claims and specification of the present disclosure may be realized in a hardware type, a software type, or a combination thereof.

The above-described embodiments of the present disclosure can be implemented in hardware, firmware or via the execution of software or computer code that can be stored in a recording medium such as a CD ROM, a Digital Versatile Disc (DVD), a magnetic tape, a RAM, a floppy disk, a hard disk, or a magneto-optical disk or computer code downloaded over a network originally stored on a remote recording medium or a non-transitory machine readable medium and to be stored on a local recording medium, so that the methods described herein can be rendered via such software that is stored on the recording medium using a general purpose computer, or a special processor or in programmable or dedicated hardware, such as an ASIC or FPGA. As would be understood in the art, the computer, the processor, microprocessor controller or the programmable hardware include memory components, e.g., RAM, ROM, Flash, etc. that may store or receive software or computer code that when accessed and executed by the computer, processor or hardware implement the processing methods described herein. In addition, it would be recognized that when a general purpose computer accesses code for implementing the processing shown herein, the execution of the code transforms the general purpose computer into a special purpose computer for executing the processing shown herein. Any of the functions and steps provided in the Figures may be implemented in hardware, software or a combination of both and may be performed in whole or in part within the programmed instructions of a computer. No claim element herein is to be construed under the provisions of 35 U.S.C. 112, sixth paragraph, unless the element is expressly recited using the phrase "means for". The terms "unit" or "module" referred to herein is to be understood as comprising hardware such as a processor or microprocessor configured for a certain desired functionality, or a non-transitory medium comprising machine executable code, in accordance with statutory subject matter under 35 U.S.C. §101 and does not constitute software per se.

Additionally, programs may be stored in an attachable storage device that is accessible via a communication network such as internet, intranet, LAN, WLAN, or SAN or a communication network including a combination thereof. Such storage device may access the electronic device 100 via an external port. Additionally, an additional storage device on a communication network may access a portable electronic device 100.

As mentioned above, after a state of an electronic device is checked through a humidity sensor and then it is determined that the electronic device is flooded, information on the state of the electronic device is stored and power is cut off, so that accurate and objective data of the electronic device at the time of flooding may be collected and realized.

As another example, while it is determined that an electronic device is flooded and state information on the electronic device is stored, if no power is supplied to the electronic device and then power is supplied again, a power connection method for supplying power to a water-proofed micro controller unit and sensor unit is used so that it prepares the case that power is supplied during a flooded state.

Moreover, in relation to a method of supplying power during power connection of the electronic device, if there is humidity in the electronic device as a humidity sensor operates first, no power is applied to the electronic device, so that a system is prevented from additional damage due to humidity.

While the disclosure has been shown and described with reference to certain preferred embodiments thereof, it will be understood by those skilled in the art that various changes in form and details may be made therein without departing from the spirit and scope of the disclosure as defined by the appended claims. Therefore, the scope of the disclosure is defined not by the detailed description of the disclosure but by the appended claims, and all differences within the scope will be construed as being included in the present disclosure.

What is claimed is:

1. A method in an electronic device, the method comprising:
   stopping, by a second processor, power supply from a battery to a first processor which performs operations of the electronic device;
   detecting, by the second processor, an event for supplying power to the first processor based on a user request after the electronic device is flooded;
   determining, by the second processor, a humidity of the electronic device using a humidity sensor; and
   supplying, by the second processor, the power from the battery to the first processor based on the humidity of the electronic device when the humidity has not reached a predetermined threshold.

2. The method of claim 1, wherein the supplying of the power from the battery to the first processor comprises:
   supplying, when the humidity of the electronic device is less than a first reference humidity, the power from the battery to the first processor.

3. The method of claim 2, further comprising:
   continuously stopping, by the second processor, the power supplied from the battery to the first processor when the humidity of the electronic device is greater than the first reference humidity.

4. The method of claim 2, further comprising:
   storing, by the first processor, data including time when it is determined that the humidity of the electronic device is less than the first reference humidity.

5. The method of claim 1, wherein the stopping the power supplied from the battery to the first processor comprises:
   determining, by the second processor, the humidity of the electronic device using the humidity sensor while the first processor performs an operation based on power supplied from the battery; and
   stopping, by the second processor, the power supplied from the battery to the first processor when the humidity of the electronic device is greater than a second reference humidity.

6. The method of claim 5, wherein the stopping the power supplied from the battery to the first processor further comprises:
   storing, by the first processor, information including time when it is determined that the humidity of the electronic device is greater than the second reference humidity.

7. The method of claim 6, wherein the information further includes state information of the electronic device,
   wherein the state information comprises at least one of visual data of the electronic device, illumination amount data around the electronic device, impact amount data applied to the electronic device, vibration amount data of the electronic device corresponding to the impact amount data, acceleration amount data of the electronic device corresponding to the impact amount data, tilt amount data of the electronic device, rotational inertia amount data of the electronic device, and running application program list data of the electronic device.

8. The method of claim 1, wherein the second processor and the battery are waterproofed.

9. An electronic device comprising:
   a battery;
   a humidity sensor;
   a first processor configured to perform operations of the electronic device based on power supply from the battery; and
   a second processor configured to control the battery and the humidity sensor,
   wherein the second processor is further configured to:
   stop the power supply from the battery to the first processor,
   detect an event for supplying power to the first processor based on a user request after the electronic device is flooded;
   determine a humidity of the electronic device using the humidity sensor, and
   supply power from the battery to the first processor based on the humidity of the electronic device when the humidity has not reached a predetermined threshold.

10. The device of claim 9, wherein the second processor is further configured to:
    supply, when the humidity of the electronic device is less than a first reference humidity, the power from the battery to the first processor.

11. The device of claim 10, wherein the second processor is further configured to:
    continuously stop the power supplied from the battery to the first processor when the humidity of the electronic device is greater than the first reference humidity.

12. The device of claim 10, wherein the first processor is further configured to:
    store data including time when it is determined that the humidity of the electronic device is less than the first reference humidity.

13. The device of claim 9, wherein the second processor is further configured to:
    determine the humidity of the electronic device using the humidity sensor while the first processor performs an operation based on the power supplied from the battery, and
    stop the power supplied from the battery to the first processor when the humidity of the electronic device is greater than a second reference humidity.

14. The device of claim 13, wherein the first processor is further configured to:
    store information including time when it is determined that the humidity of the electronic device is greater than the second reference humidity.

15. The device of claim 14, wherein the information further includes state information of the electronic device,
    wherein the state information comprises at least one of visual data of the electronic device, illumination amount data around the electronic device, impact amount data applied to the electronic device, vibration amount data of the electronic device corresponding to the impact amount data, acceleration amount data of the electronic device corresponding to the impact amount data, tilt amount data of the electronic device, rotational inertia amount data of the electronic device, and running application program list data of the electronic device.

16. The device of claim 9, wherein the second processor and the battery are waterproofed.

* * * * *